Patented Sept. 4, 1945

2,384,106

UNITED STATES PATENT OFFICE 2,384,106

ALKOXY NITRILES

Joy G. Lichty, Stow, Ohio, assignor to Wingfoot Corporation, Akron, Ohio, a corporation of Delaware No Drawing. Application May 16, 1941,
Serial No. 393,782

8 Claims. (Cl. 260—464)

This invention relates to the reaction of certain halogenated propionitriles with alcoholates and to certain products of such reaction. More particularly, it relates to the treatment of halogenated propionitriles to remove halogen therefrom to obtain products which may or may not contain residues of the alcoholate employed.

It has been found that propionitriles containing two or three halogen groups may be treated with an alcoholate to remove some or all of the halogen, the products obtained sometimes having a hydrocarbonoxy group or groups therein and other products of the reaction not being so characterized. To illustrate, dichloro isobutyronitrile may be reacted with methanol and sodium hydroxide (Na methylate) to yield products which include alpha methyl beta chloroacrylonitrile, dimethoxy isobutyronitrile and a compound which is probably alpha methyl beta methoxy acrylonitrile. It will thus be seen that the reaction yields compounds in which the chlorine present has either been reduced in amount or is totally absent and, at the same time, zero or one or two or three methoxy groups have been introduced. The reaction is therefore useful for the preparation of any or all of the compounds mentioned and other similar compounds, depending on the starting materials which are reacted.

The reaction is applicable to the treatment of the class of alpha beta dihalo propionitriles which contain additionally, in the alpha position, one of the group consisting of alkyl and halogen radicals. That is to say, an alcoholate, preferably an alkali metal alcoholate, such as the sodium and potassium alcoholates, may be reacted with alpha-alkyl, alpha, beta-dihalo propionitriles and with alpha, alpha, beta trihalo propionitriles. In each case, the compounds containing chlorine are the most available but there may also be used the bromine compounds or compounds in which two different halogen radicals, such as chlorine and bromine, are represented.

The alcoholate which is employed, either as such, or preferably, as a mixture of the alcohol and the alkali metal hydrate, with the alcohol in excess, may be that of various alcohols, such as methyl alcohol, ethyl alcohol, propyl alcohol, isopropyl alcohol, butyl alcohol and the like. The lower members of the series are preferred, largely because of their greater availability and greater reactivity.

To illustrate the method, the following examples are given, although it will be understood that the invention is not limited thereto.

Example 1

A 160 gram portion of 50% NaOH (2 mols) was added to 276 grams of dichloro isobutyronitrile (2 mols) in 600 cc. of 95% ethyl alcohol. An exothermic reaction took place which was controlled by adequate cooling. Upon the completion of the reaction, the alcohol was distilled from the reaction product and the residue washed with water. The dried organic layer gave the following fractions:

|   | Grams |
|---|---|
| 1. B. P. 150–158° C | 62.1 |
| 2. B. P. 158°/atm–140°/27 mm | 59.3 |

Fraction #1 consisted of alpha methyl beta chloro acrylonitrile which is a compound that may be copolymerized with butadiene-1,3 and other monomers. Fraction #2 is a mixture of higher boiling compounds. One of the reactions involved in the foregoing procedure is the following:

$$CH_2Cl-\underset{\underset{CH_3}{|}}{C}Cl-CN + C_2H_5ONa \longrightarrow$$

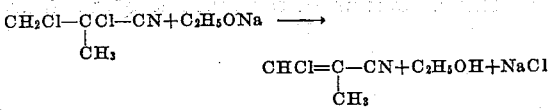

Example 2

A solution of 160 grams of NaOH in 350 cc. of water was slowly added to a well-stirred solution of 276 grams of dichloro isobutyro nitrile in 500 cc. of methanol. When the reaction was completed, the methanol was distilled out and the organic layer separated from the residue. The aqueous layer, on treating with sulfuric acid and extracting with ether, gave 17.6 grams of a liquid containing an acid. The organic layer was dried and distilled at reduced pressure to give 106.3 grams of a product having a maximum boiling point of 100°C./28 mm. Redistillation gave two products, one boiling at 80–83°C./27 mm. and the other boiling at 92–93°C./27 mm. The latter is probably dimethoxy isobutyronitrile, a compound which is believed to be new. It has the following properties: $D_{15}^{28}=0.974$; $N_D^{32}=1.4133$. % N found: 10.9, 10.8; calc. for dimethoxy isobutyronitrile; 10.85.

The lower boiling product may be beta methoxy alpha methyl acrylonitrile. Its properties and analysis are as follows: $D_{15}^{29}=0.9410$; $N_D^{27}=1.4450$. % N found: 13.65, 13.62, 13.65;

Calc. for $CH_3OCH=\underset{\underset{CH_3}{|}}{C}-CN$, 14.45

The variance in the analysis may be due to incomplete removal of the higher boiling dimethoxy isobutyronitrile. The monomethoxy compound can theoretically exist in both the cis and trans forms. One of the reactions involved in the foregoing example is the following:

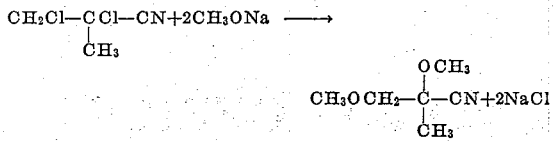

Example 3

Three mols of sodium metal were reacted with 900 cc. of methanol and then 158.5 grams (1 mol) of trichloro propionitrile was added to the refluxing solution of sodium methylate in methanol. Upon completion of the reaction, the salt was filtered out and the methanol was removed by distillation. The distillation was then continued under reduced pressure until there was collected 53.1 grams of a product boiling at 106–108° C/19 mm. This product had the following properties: $D_{15}^{32}=1.0703$; $N_D^{26}=1.4231$. % N found: 10.4, 10.5; calc. for trimethoxy propionitrile, 9.66.

This trimethoxy propionitrile is believed to be a new compound. The equation for the reaction leading to its formation is as follows:

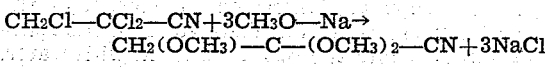

The reaction may be applied to other starting materials, as previously mentioned. For example, trichloro propionitrile may be reacted with sodium ethylate or potassium ethylate, and alpha ethyl, alpha, beta dichloro propionitrile may be reacted with sodium methylate or sodium ethylate or the corresponding potassium compounds.

The conditions of the reaction are not critical but, usually, it will be necessary to cool the reaction vessel since the reaction is often exothermic. Certain of the products obtained are thought to be new, namely, the alpha beta dialkoxy propionitriles containing additionally in the alpha position to the nitrile radical a substituent from the group consisting of the alkyl and alkoxy radicals. Among them are the alpha alkyl alpha beta dialkoxy propionitriles, such as alpha methyl alpha beta dimethoxy propionitrile, or, dimethoxy isobutyro nitrile. Also included are the alpha alkoxy, alpha, beta dialkoxy propionitriles, such as trimethoxy propionitrile, triethoxy propionitrile, and tripropoxy propionitriles, two of the alkoxy groups, in each instance, being found in the alpha position.

While there have been described above the preferred embodiments of the invention, it will be apparent to those skilled in the art that various modifications and changes may be made therein without departing from the spirit of the invention or from the scope of the appended claims.

I claim:

1. The dialkoxy propionitriles containing additionally in the alpha position a substituent from the group consisting of the alkyl and alkoxy radicals.

2. The alpha, beta dialkoxy propionitriles containing additionally in the alpha position a substituent from the group consisting of the alkyl and alkoxy radicals.

3. The alpha alkyl, dialkoxy propionitriles.

4. The alpha alkyl, alpha, beta dialkoxy propionitriles.

5. The alpha methyl, dimethoxy propionitriles.

6. Alpha methyl, alpha, beta dimethoxy propionitrile.

7. The alpha, alpha, beta trialkoxy propionitriles.

8. Alpha, alpha, beta trimethoxy propionitrile.

JOY G. LICHTY.